July 5, 1938.  H. S. CAMPBELL  2,122,450
AIRCRAFT WITH ROTATABLE SUSTAINING MEANS
Filed July 6, 1934  4 Sheets-Sheet 1

INVENTOR
Harris S. Campbell
BY
Synnestvedt + Lechner
ATTORNEYS

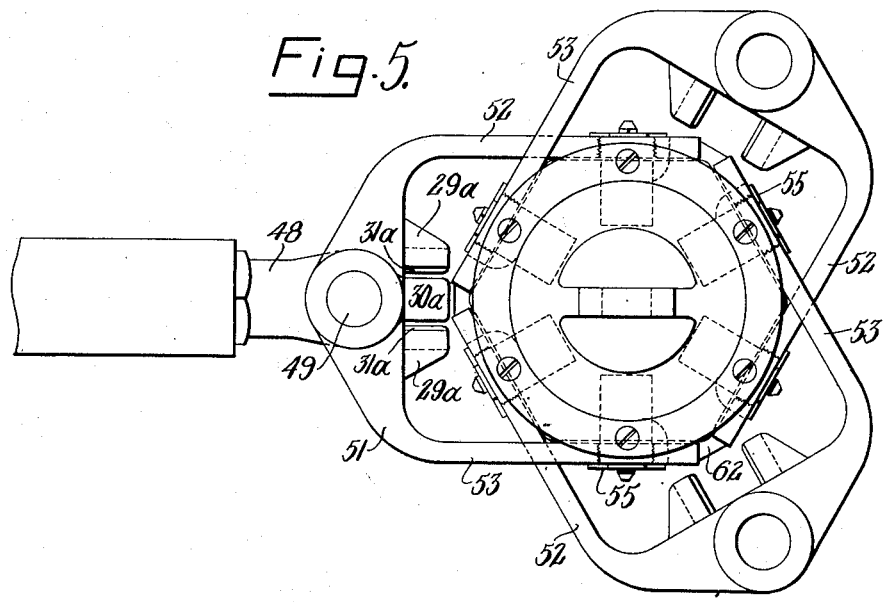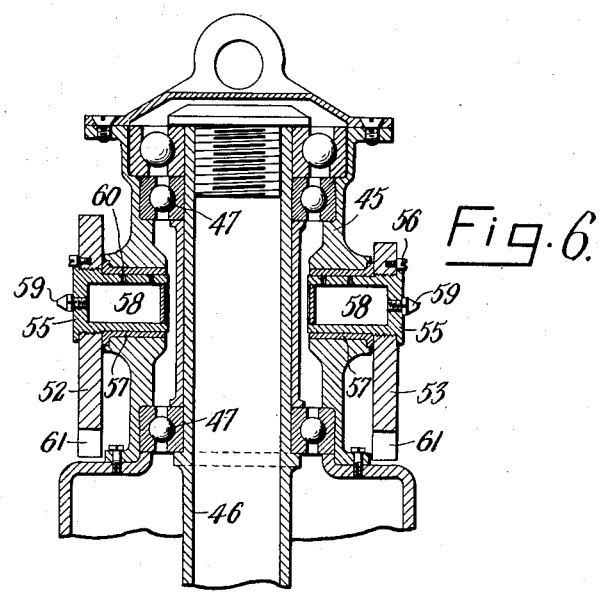

July 5, 1938.    H. S. CAMPBELL    2,122,450
AIRCRAFT WITH ROTATABLE SUSTAINING MEANS
Filed July 6, 1934    4 Sheets-Sheet 4

INVENTOR
Harris S. Campbell
BY
Synnestvedt + Lechner
ATTORNEYS

Patented July 5, 1938

2,122,450

UNITED STATES PATENT OFFICE 2,122,450

AIRCRAFT WITH ROTATABLE SUSTAINING MEANS

Harris S. Campbell, Willow Grove, Pa., assignor to Autogiro Company of America, Philadelphia, Pa., a corporation of Delaware Application July 6, 1934, Serial No. 733,980

21 Claims. (Cl. 244—18)

This invention relates to aircraft with rotatable sustaining means, and is more particularly concerned with sustaining rotors for such craft of the multi-bladed and pivoted type.

One of the principal objects of the invention is to minimize the angular shift of the rotor lift line with respect to the center of gravity of the craft in different conditions of flight and thus to improve controllability and automatic stability.

In aircraft sustaining rotors of the type incorporating a plurality of blades each of which are pivoted or articulated to provide freedom for variations in aerodynamic angle of attack of the blades or wings in flight, it is recognized that advantages are secured by positioning the pivots for the blades so that their axes either intersect or pass close to the generally upright axis of the hub about which the rotor as a whole rotates. This is recognized, for example, in the prior application of Juan de la Cierva, Serial No. 592,487, filed February 12th, 1932, issued January 22, 1935 as Patent No. 1,988,836, which discloses, among other things, a four-bladed sustaining rotor the blades of which are arranged in pairs about a hub member, with one pair superimposed above the other. In the prior construction just mentioned the blades of each pair are pivoted to the hub member by means of interfitting forks which embrace the hub from opposite sides thereof, a pivot pin or pins being passed through apertures in the hub and in the prongs of the forks. In this way two blades in a four-bladed rotor may be pivoted to a hub member in the same general plane, although the plane of the remaining two blades must be vertically spaced from the first plane, since the forks for the two pairs would otherwise interfere with each other.

However, for various aerodynamic and structural reasons it is desirable to be able to secure all the blades of a multi-bladed rotor to the hub member in a single plane, and the present invention is concerned with the provision of a sustaining rotor incorporating three or more blades all of which are pivotally secured to the hub member in a common plane and on pivot axes which may be arranged to intersect the axis of the upright rotational hub or to intersect the body of the hub structure itself close to said rotational axis. The invention, therefore, is of especial advantage in a three-bladed sustaining rotor for the reason that a seriously unbalanced condition would result were the blades of a three-bladed rotor secured to the hub in vertically spaced planes.

A three-bladed sustaining rotor, furthermore, has decided advantages over other types. For example, as compared with a rotor having four or more blades, a three-bladed rotor is considerably simpler to manufacture, assemble and service. In addition, a three-bladed rotor lends itself much more readily to folding for storage purposes than rotors having more than three blades.

Still further, as compared with a two-bladed rotor, the three-bladed type is aerodynamically much more efficient. The invention, therefore, in making possible the pivoting of the blades of a three-bladed rotor on or close to the axis of rotation, is of considerable importance and, in a number of respects, makes the three-bladed type of rotor much more practicable than it has been heretofore.

How the foregoing objects and advantages are attained will be set forth more fully in the following description, making reference to the accompanying drawings, in which—

Figure 5 is a view similar to Figure 2 but showing a modified construction;

Figure 6 is a vertical sectional view through the hub of the arrangement shown in Figure 5.

Figure 1:
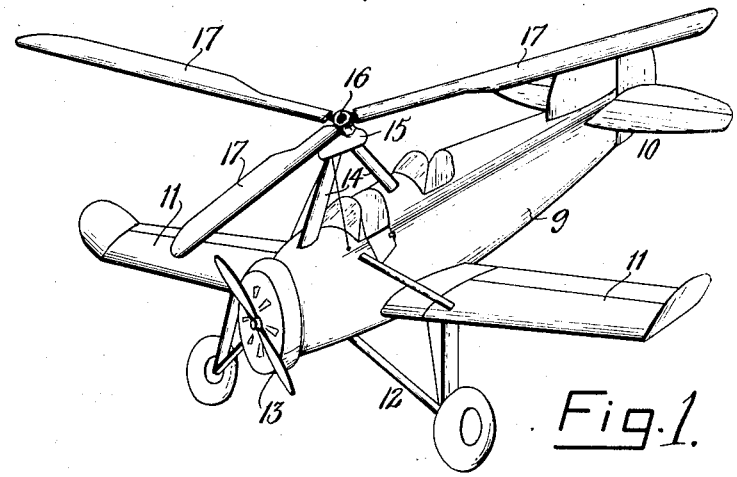
Figure 1 is a perspective view of an aircraft of the type here under consideration incorporating a three-bladed sustaining rotor constructed in accordance with this invention.

Referring first to Figure 1, the numeral 9 indicates the body of a craft of the type with which this invention is concerned. This craft may be equipped with an empennage 10, fixed sustaining wings 11, undercarriage 12, and propulsion means 13.

The rotor may be mounted above the body in any suitable manner as by means of struts 14 which converge upwardly to be joined to a pylon apex member 15 in which the rotor hub generally indicated at 16 may be journalled. The rotor shown on the craft in Figure 1 includes three blades 17, all of which are pivotally connected with the hub 16 in the manner now to be set forth.

Figure 2:
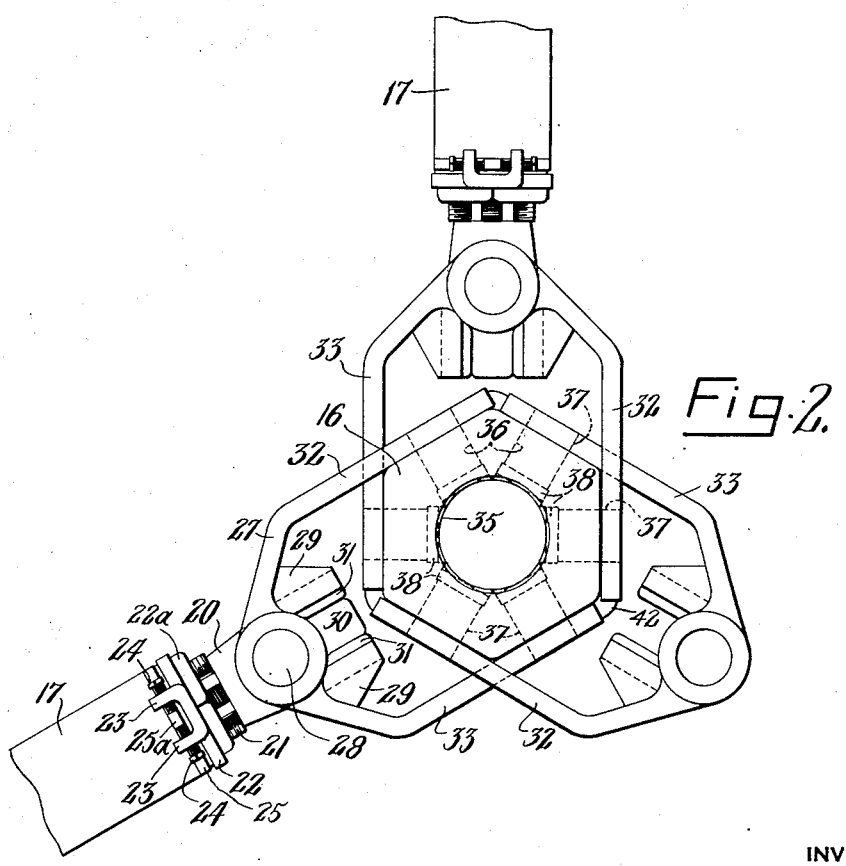
Figure 2 is an enlarged plan view of one form of the hub and inner ends of the sustaining blades of a three-bladed rotor.
Figure 3:
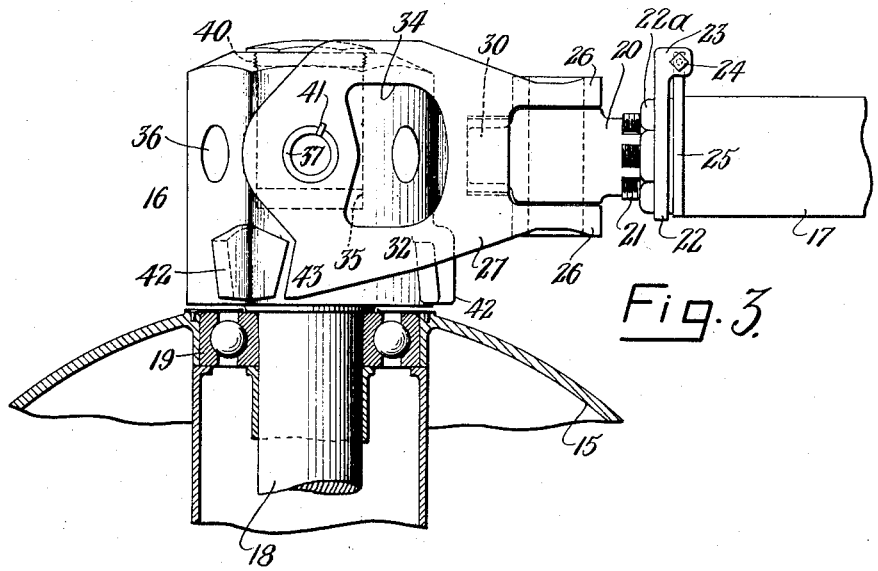
Figure 3 is a side view of the hub and the inner end of one of the sustaining blades shown in Figure 2.
Figure 4:
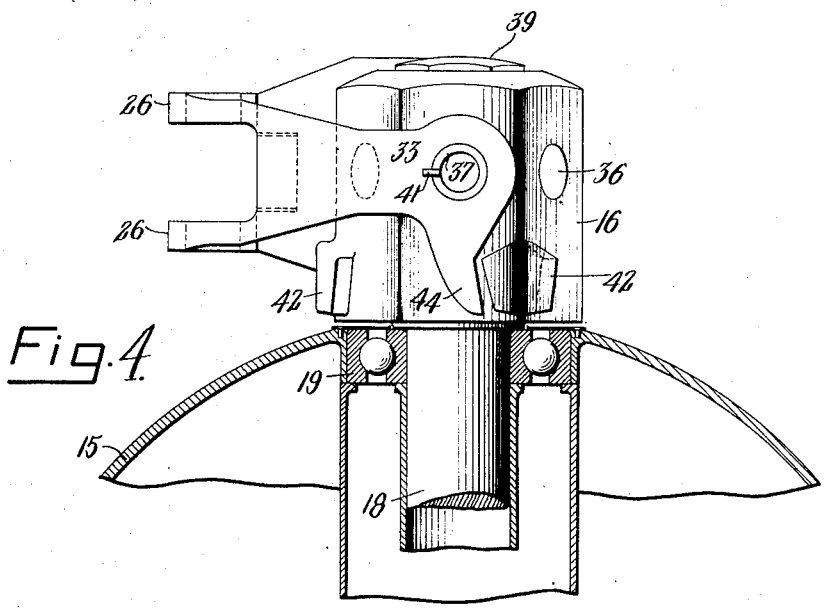
Figure 4 is a view similar to Figure 3, taken from the opposite side of the hub.
Figure 7:
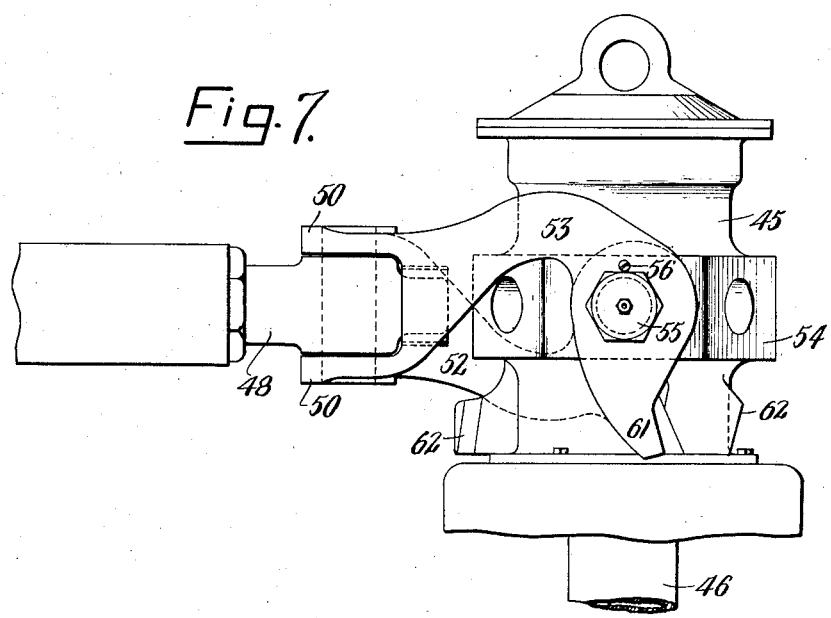
Figures 7 and 8 are side elevational views of the hub of Figures 5 and 6, the views being taken from opposite sides thereof and showing the attachment of one of the sustaining blades.
Figure 8:
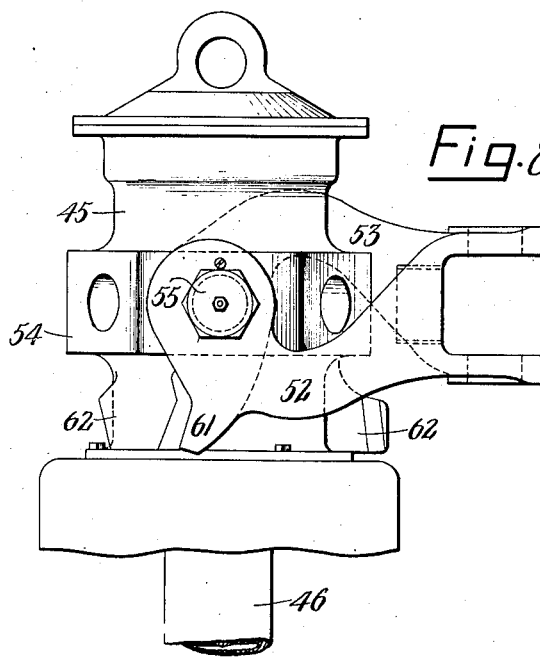

As seen in Figures 2 to 4 inclusive, the hub member 16 takes the form of a hexagonal block having a spindle 18 projecting downwardly therefrom into the supporting apex 15 in which the spindle may be journalled as by means of one or more bearings 19. The hub member is thus preferably journalled for free rotation, and the wings or blades 17 are preferably arranged for autorotative actuation by the airflow during flight.

A root end fitting 20 is joined with the inner end of each blade 17, and at the junction I prefer to provide a mechanism for adjusting the incidence or pitch angle of the wings 17. As clearly seen in Figures 2 and 3, this mechanism includes threaded segments or parts 21 formed on the fitting 20 and adapted to be threaded into the root end of the blade 17. The collar 22, which has a splined engagement with the threaded segments 21, carries a pair of opposed brackets 23—23 into which adjusting bolts 24—24 are threaded. Another collar or ring 25, which is rigidly mounted on the blade, carries an arm 25a which projects between the adjusting bolts 24—24. In this way, adjustment of the bolts 24 provides for adjustment of the angular position of the fitting 20 and the blade. The nut 22a, also threaded on the segments 21, may be employed to rigidly clamp the collar 22 against the end of the blade for the purpose of ensuring the maintenance of any adjustment.

The member 20 is connected with apertured lugs 26—26 formed on the forked member or "extension block" 27, a pivot pin 28 being employed for this purpose, thus providing freedom for movement of the blade with respect to the extension block 27 in a direction generally within the rotative path of travel of the blade around the axis of the hub. Movement of the blade about pivot 28 may be restricted or controlled by means of opposed stops or brackets 29—29, between which an extension 30 rigid with member 20, projects. If desired, resilient or rubber cushions 31 may be interposed between the projection 30 and the stops 29 so as to provide yielding resistance to blade movements.

The prongs or forks 32 and 33 of the extension block project to embrace the hub 16. As clearly seen in Figures 3 and 4, these prongs are shaped as follows:—Prong 32 is apertured as at 34, and prong 33 is of reduced width in a substantially central area thereof. The width of prong 33 and the overall height of the aperture in prong 32 are relatively proportioned so that a prong 33 of an adjacent extension block for another blade may readily be inserted through the aperture. From inspection of Figure 2 along with Figures 3 and 4 it will be observed that the several prongs of the three extension blocks are serially interfitted about the hub. The dimensions of the forks or prongs 33 and of the apertures 34, furthermore, are so relatively proportioned as to permit the desired degree of freedom for individual blade swinging movements about the pivot pins now to be described which serve to couple the extension blocks with the hub member 16.

In the arrangement of Figures 1 to 4 inclusive, the hub member 16 is provided with a central cavity 35 from which a plurality of pin receiving apertures 36 radiate, one aperture 36 opening through each face of the hexagonal hub block. The extremities of forks 32 and 33 are apertured in registry with diametrically opposed apertures 36 of the hub, and pivot pins 37 are inserted so as to provide, for each extension block, a pivot axis which intersects the upright rotational axis of the hub 16. The pins 37 and the central cavity 35 in the hub member are preferably proportioned so that the pins may be inserted into the apertures 36 from within the hub cavity. The pins, moreover, are preferably provided with enlarged head parts 38 to prevent radially outward movement thereof. In order to positively ensure retention of the pins in their proper positions, I prefer to employ a block or plug 39 which may be inserted into the hub cavity 35. This plug may be threaded in the hub as indicated at 40 in Figure 3. In order to obtain maximum bearing surface to carry the loads incident to swinging of the wings on the pins 37, I preferably secure the pins in the prongs 32 and 33 as by means of keys 41 (see Figures 3 and 4). The pins must therefore move with the extension blocks, and pivotal movement takes place at the more extensive bearing area of the pins in the hub 16.

Excessive downward swinging movement of the blade 17 about the pivots 37 may be prevented by means of lugs or stops 42 formed on the hub in position to contact with the downward projections 43 and 44 which are formed, respectively, on prongs 32 and 33 of each extension block. It will be understood, of course, that the stops 42 and the projections 43 and 44 are relatively positioned so that the wings are permitted entire freedom for force compensating movements during flight operation. The stops preferably come into operation only when the rotor comes to rest.

With further reference to the projections 44 mentioned just above, it is to be noted that these are so constructed that they do not interfere with assembly of the several extension blocks about the hub. Each prong 33 may be inserted through the aperture 34 in an adjacent prong 32 by tilting or inclining the extension block downwardly and then passing the fork 33 through the aperture 34, with the projection 44 leading. After the projection 44 passes through the aperture 34, of course, the extension block may be tilted upwardly into its more normal position for the purpose of attachment to the hub by insertion of the pivot pins 37.

The foregoing mechanism is highly effective for the purposes of this invention, especially since it provides for pivotal attachment of each one of three or more blades to a hub, with the pivot axes all intersecting the hub axis, and furthermore with the blades all lying in a common plane. This is accomplished while maintaining at a minimum the overall size of the hub and the associated attachment devices, especially as to height. The arrangement described above is also of especial advantage in simplifying the hub and pivot arrangements and in providing a very effective means for ensuring retention of the pivot pins in their proper positions. Still further, even though a blade incidence adjustment mechanism is employed and even though the rotor head structure as a whole also incorporates means for controlling or limiting individual blade movements about the pivots 28, the entire mechanism presents an effectively stream-lined shape of relatively small dimensions. Material improvement in operating efficiency is secured by virtue of the location of the stops or controlling devices 29—29 and 30 entirely within the overall confines of the extension block, instead of exteriorly thereof or at some point on the blade itself, as has been done in prior constructions.

Turning now to the arrangement illustrated in Figures 5 to 8 inclusive, it is first noted that the blade attachment means here shown also provides for the attachment of three or more blades all lying in a common plane. The hub member appears at 45 in Figure 6, from which it will be seen that the hub is generally of tubular shape. The hub is mounted on a central and relatively fixed spindle 46 as by means of bearings 47. The blade or wing attachment and pivoting mechanism of this form includes a fitting or member 48 at the root end of each blade similar to the fitting 20 described above in connection with Figures 1 to 4 inclusive. This member is pivotally secured, as by pivot pin 49, to apertured lugs 50—50 formed on the extension block 51. The blade movement control or limiting devices 29a—29a and 30a, similar to those already described, may also be provided in this form of mechanism. As shown in Figure 5, however, the control mechanism is arranged with the resilient cushions 31a—31a spaced somewhat from the cooperating stops, so as to permit the blade a certain degree of unrestricted pivotal movement.

The forks or prongs 52 and 53 of each extension block are differently formed, one (52) being curved downwardly and then upwardly toward its inner end, and the other (53) being curved upwardly and then downwardly towards its inner end. As will readily be understood from a comparison of Figures 5, 7 and 8, the several prongs 52 and 53 of the three extension blocks serially overlie and underlie each other about the hub, the curvature of the prongs being such that ample freedom is provided for the normal blade swinging movements to compensate for variations in flight forces.

In the arrangement of Figures 5 to 8 inclusive, the hub member 45 is preferably provided with a plurality of faces 54 which define a hexagon shape. As in the construction first described, diametrically opposite pairs of surfaces 54 are embraced by the prongs 52 and 53 of the respective extension blocks. Pivot pins 55 are passed through apertures in the forks 52 and 53 to provide the pivot axis for the wing which either passes close to the upright rotational axis or intersects that axis in the manner shown. As illustrated particularly in Figure 6, the pivot pins may be threaded into the forks 52 and 53 so as to secure them in position, and I preferably also provide some means such as the lock screw 56 (see Figures 6 and 7) for the purpose of preventing loosening of the pivot pins.

Suitable anti-friction bushings or the like 57 are positioned in the hub apertures which receive the pins, and in order to provide effective lubrication for the bearing surfaces the pins are hollowed to form lubricant reservoirs 58 which may be filled as by a pressure fitting 59. Ducts 60 conduct the lubricant from the reservoir 58 to the bearing surface.

In a manner similar to the first described embodiment, the second form of the invention makes provision for the support of the blades as against excessive drooping when the rotor is at rest. Downward projections 61 on the prongs 52 and 53 of the extension blocks, and cooperating lugs 62 on the hub, serve this purpose.

From the foregoing it will be seen that both embodiments of the invention provide for attachment of radially arranged blades to a common hub by the use of members such as extension blocks (27 in Figures 1 to 4 inclusive, and 51 in Figures 5 to 8 inclusive) which are irregularly formed to provide for pivotal attachment toward a side or at the sides of the hub, and also to provide for connection with the inner end of the wings in a manner to retain the longitudinal axes of the wings in position to intersect the upright rotational axis of the hub, i. e., in truly radial position.

Note also that even though the several wings are mounted so that they all lie in a common plane and are pivotally attached to the hub on axes which intersect each other and the rotational axis at a single point, ample freedom for the normal blade swinging movements to compensate for variations in flight forces is provided. It is also of importance especially in view of the fact that the rotor is preferably of the autorotative type, that the mechanism for limiting or controlling blade swinging movements about the generally upright pivot pins 28 is located entirely within the overall confines of the extension blocks.

The two forms of mechanism are also composed of relatively simple parts which are, moreover, of relatively great strength as compared with size and weight. The extension blocks and other blade mounting and pivoting elements may readily be assembled or taken down.

In comparing the two forms of the invention disclosed, it will be seen that the mechanism of Figures 1 to 4 inclusive has an advantage in substantially uniform distribution of the bulk and metal of the extension blocks 27 above and below the plane of the wings and of their pivotal connection with the hub, notwithstanding the fact that the two prongs of each fork are differently formed. On the other hand, the arrangement of Figures 5 to 8 inclusive may very readily be assembled or taken down, the extension block for any wing being removable independently without disturbing the pivotal mounting for the remaining wings.

I claim:—

1. An aircraft sustaining rotor including at least three sustaining wings, a hub device, and pivot means joining the wings and the hub device, the pivot means being constructed and arranged to provide individual pivot axes for the several wings, all of which axes intersect the axis of the hub device at a single point, the hub device being hollowed and being provided with pivot pin apertures, the axes of which coincide with the pivot axes and are at angles to the longitudinal axes of the respective wings, together with pivot pins insertable into said apertures through the hollowed portion of the hub device.

2. An aircraft sustaining rotor including at least three sustaining wings, a hub device, and pivotal mounting means joining the wings and the hub device, the mounting means being constructed and arranged to provide individual pivot axes for the several wings, all of which axes intersect the axis of the hub device at a single point, the pivotal mounting means including a mounting member for each wing having a part thereof connected with the wing at a point along its longitudinal axis, and a part thereof connected with the hub device at a point laterally offset from the longitudinal axis of the wing, together with a stop or wing support element carried on the hub device and positioned to contact with said wing mounting member.

3. An aircraft sustaining rotor including at least three sustaining wings, a hub device, pivot means joining the wings and the hub device, the pivot means being constructed and arranged to provide individual pivot axes for the several wings, all of which axes intersect the axis of the hub device at a single point, the pivot means including a pivot member for each wing connected therewith at a point substantially along its longitudinal axis, a pivot pin at said point providing freedom for wing swinging movements in flight, the pivot member further being connected with the hub device at a point laterally offset from the longitudinal axis of the wing, a stop or wing support element carried on the hub device and positioned to contact with a wing pivot member, and means for controlling wing swinging movements on said pivot pin also reacting with the pivot member for the wing.

4. An aircraft sustaining rotor including a hub device, at least three sustaining wings, and a bifurcated or forked member for each wing, each of which is connected with a wing adjacent its base and has the forks thereof extended to embrace the hub device, one fork of each member having an aperture of greater overall height than the height of the other fork of said member, and the several members being arranged around the hub with the said other fork of each member projecting through the apertured fork of an adjacent member, and pivots joining the fork ends with the hub device.

5. An aircraft sustaining rotor including a hub device, at least three sustaining wings, and a bifurcated or forked member for each wing, each of which is connected with a wing adjacent its base and has the forks thereof extended to embrace the hub device, one fork of each member being recessed or curved downwardly and the other being recessed or curved upwardly, and the several forks being arranged around the hub device with their downwardly and upwardly curved portions serially underlying and overlying each other, and pivots joining the fork ends with the hub device.

6. An aircraft sustaining rotor including a hub device, a sustaining wing, an extension block joining the wing and the hub device and being pivoted to the wing and to the device on relatively angled pivot axes, and means for controlling pivotal movements about one of said axes lying substantially entirely within the overall confines of the extension block.

7. An aircraft sustaining rotor including a hub device, a sustaining wing, a forked member for connecting the wing with the hub device having the base thereof connected with the wing and the forks thereof embracing and connected with the hub, a pivot pin serving as a means of connection of the base of the forked member with the wing, and means for controlling pivotal movements about said pivot, the controlling means being positioned between the forks of said member substantially in the plane thereof.

8. An aircraft sustaining rotor including a hub device, a sustaining wing, a forked member for connecting the wing with the hub device having the base thereof connected with the wing and the forks thereof embracing and connected with the hub, a pivot pin serving as a means of connection of the base of the forked member with the wing, and means for controlling pivotal movements at said pivot, including an element movable with the wing and projecting radially inwardly toward the hub device from said pivot between the prongs of the forked member, and means on the forked member cooperating with said element to control pivotal movements.

9. An aircraft sustaining rotor including a hollowed hub device, a sustaining wing, and pivot means for joining the sustaining wing to the hub device, including a pivoted member connected with the wing and movable therewith and a cooperating pivot pin having its axis at an angle to the longitudinal axis of the wing, the hub device being apertured to receive the pin, and the pin being insertable into an aperture from the interior of the hub device.

10. An aircraft sustaining rotor including a hollowed hub device, a sustaining wing, and pivot means for joining the sustaining wing to the hub device, including a pivoted member connected with the wing and movable therewith and a cooperating pivot pin having its axis at an angle to the longitudinal axis of the wing, the hub device being apertured to receive the pin, and the pin being insertable into an aperture from the interior of the hub device, together with displaceable means in the hub device adjacent the inner end of said pin to retain the pin in operative position.

11. For aircraft sustaining rotors, a wing mounting fitting comprising a double-ended fork with one fork end extending in a plane substantially at right angles to the other fork end, the prongs of one fork end being apertured to receive a wing pivot lying substantially in a plane containing the rotor axis and the prongs of the other fork end being apertured to receive pivot mounting means in the horizontal plane of the wing for attachment to the hub of the rotor, the prongs of the latter fork end being bent, in an intermediate region, out of the plane of the wing and its pivot whereby to interfit in overlapping relation with the adjacent ends of a plurality of adjacent wing fittings when assembled on a rotor hub.

12. For aircraft sustaining rotors, a wing mounting fitting comprising a double-ended fork with one fork end extending in a plane substantially at right angles to the other fork end, the prongs of one fork end being apertured to receive a wing pivot lying substantially in a plane containing the rotor axis and the prongs of the other fork end being apertured to receive pivot mounting means in a plane substantially perpendicular to the rotor axis for attachment to the hub of the rotor, the last mentioned prongs being shaped in a mid-portion one upwardly and one downwardly to clear the complementary prongs of adjacent wing mounting forks.

13. For aircraft sustaining rotors, a wing mounting fitting comprising a double-ended fork with one fork end extending in a plane substantially at right angles to the other fork end, the prongs of one fork end being apertured to receive a wing pivot lying substantially in a plane containing the rotor axis and the prongs of the other fork end being apertured to receive pivot mounting means in a plane substantially perpendicular to the rotor axis for attachment to the hub of the rotor, one of the prongs of the last mentioned fork end being provided at an intermediate point with a transversely extending aperture through which a complementary prong of an adjacent wing mounting fork may be inserted.

14. In a sustaining rotor for aircraft, a hub member rotatable about an upright axis, at least three sustaining wings extending therefrom, a mounting pivot device for each wing lying generally in a plane substantially perpendicular to the rotor axis, the axes of the three pivot devices lying substantially in a common plane and extended at an angle to the longitudinal wing axis to provide for movement of adjacent wings in planes which are angled with respect to each other, and for each wing a wing mounting fitting connected to each pivot, the three fittings lying generally in a common plane substantially perpendicular to the rotor axis and being in overlapped relation when viewed in plan, and means providing clearance between them at their zones of overlap to accommodate the pivotal movements of the wings on their pivot devices.

15. For an aircraft with rotatable sustaining means, a sustaining rotor construction comprising at least three sustaining wings capable of autorotational actuation and positioned in angularly spaced relation about the axis of the rotor, a hub device rotatable about an upright axis, a wing mounting fitting for connecting each wing to said hub device, each wing mounting fitting having its inner end provided with unsymmetrical fork prongs which, when assembled with other similar fittings, serially interfit around the hub, a pivot lying substantially in a plane containing the rotor axis and the longitudinal blade axis, the pivot being set at an angle to the longitudinal axis of the wing and connecting each wing to its respective mounting fitting, and a pivot for connecting the prongs of each fitting to the hub and having its axis lying generally in a plane substantially perpendicular to the rotor axis and at an angle to the longitudinal axis of the wing, all of said latter pivot devices lying generally in a common plane substantially perpendicular to the rotor axis, and each intersecting the hub substantially at the central axis thereof, whereby to provide freedom for individual and independent pivotal movement of the several wings in generally vertical planes, the serially interfitting prongs of the wing mounting fittings having clearance accommodating said individual and independent pivotal movement of the several wings.

16. In a sustaining rotor for aircraft, a hub member rotatable about an upright axis, at least three sustaining wings extending therefrom, a mounting pivot device for each wing lying generally in a plane substantially perpendicular to the rotor axis, the axes of said pivot devices lying in a common plane, intersecting the rotational axis of the hub, and extended at an angle to the longitudinal wing axis to provide for movements of adjacent wings in planes which are angled with respect to each other, and for each wing a wing mounting fitting connected to each pivot, the three fittings lying generally in a common plane perpendicular to the rotor axis and being in overlapped relation when viewed in plan, and means providing clearance between them at their zones of overlap to accommodate the pivotal movements of the wings on their pivot devices.

17. An aircraft sustaining rotor including a hub, at least three sustaining blades located in a common plane and substantially equi-spaced about the hub, for each blade a pivotal mounting to provide freedom for movements of the blade on the hub, each blade mounting including fork and pivot elements the former of which embrace the hub and serially overlap similar parts of adjacent blade mountings generally in a common plane substantially perpendicular to the rotor axis, one fork element of each blade mounting being formed to pass an element of an adjacent blade mounting with sufficient clearance to accommodate differential movement of the adjacent blade mounting in a plane perpendicular to the common plane of the blades.

18. An aircraft sustaining rotor including a hub, at least three sustaining blades located in a common plane and substantially equi-spaced about the hub, for each blade a pivotal mounting to provide freedom for movements of the blade on the hub, each blade mounting including fork and pivot elements the former of which embrace the hub and serially overlap similar parts of adjacent blade mountings generally in a common plane substantially perpendicular to the rotor axis, one fork element of each blade mounting being apertured to pass an element of an adjacent blade mounting, said aperture being of a size sufficient to accommodate differential movement of the adjacent blade mounting in a plane perpendicular to the common plane of the blades.

19. An aircraft sustaining rotor including a hub, at least three sustaining blades located in a common plane and substantially equi-spaced about the hub, for each blade a pivotal mounting to provide freedom for movements of the blade on the hub, each blade mounting including fork and pivot elements, and the fork having prongs embracing the hub and serially overlapping prongs of adjacent blade mountings in substantially a common plane, one prong of the fork for one blade being apertured, and an overlapping prong of the fork for an adjacent blade being extended through the apertured prong, said aperture being of a size sufficient to accommodate differential movement of the other prong in a plane perpendicular to the common plane of the blades.

20. For aircraft sustaining rotors having wings and a hub, a wing mounting fitting comprising a double-ended fork with one fork end extending generally in a plane substantially perpendicular to the rotor axis and substantially at right angles to the other fork end, the prongs of the fork at said one end being unsymmetrically formed relative to each other whereby to interfit in overlapping relation with the corresponding end of a similar adjacent wing fitting when assembled on a rotor hub generally in a common plane substantially perpendicular to the rotor axis.

21. In an aircraft sustaining rotor having a hub rotatable about an upright axis and at least three auto-rotatable blades radiating therefrom and substantially equi-spaced therearound, an individual pivot for each blade providing an axis oriented to accommodate individual movement of the blade in a plane which intersects the general plane of rotation, all said pivot axes intersecting each other and the hub axis at a common point, and unsymmetrical, interfitting forks, one for each blade, securing said blades to their pivots and positioned to provide clearance between said forks throughout the normal range of individual and independent pivotal movements of the several blades, the interfitting forks lying generally in a plane substantially perpendicular to the rotor axis.

HARRIS S. CAMPBELL.